United States Patent
O'Rourke et al.

(10) Patent No.: US 7,232,855 B2
(45) Date of Patent: *Jun. 19, 2007

(54) LOW POLARITY DIMERATE AND TRIMERATE ESTERS AS PLASTICIZERS FOR THERMOPLASTIC POLYMER/ELASTOMER COMPOSITES

(75) Inventors: Stephen O'Rourke, Bolingbrook, IL (US); Kimberly L. Stefanisin, Oak Lawn, IL (US); Gary Wentworth, Chicago, IL (US); Urvil B. Shah, Mokena, IL (US); Yen Vu, Westmont, IL (US)

(73) Assignee: CPH Innovations Corp., Chicago, IL (US)

( * ) Notice: Subject to any disclaimer, the term of this patent is extended or adjusted under 35 U.S.C. 154(b) by 764 days.

This patent is subject to a terminal disclaimer.

(21) Appl. No.: 10/360,294

(22) Filed: Feb. 7, 2003
(Under 37 CFR 1.47)

(65) Prior Publication Data

US 2005/0038161 A1 Feb. 17, 2005

Related U.S. Application Data

(60) Provisional application No. 60/396,453, filed on Jul. 17, 2002.

(51) Int. Cl.
*C08K 5/12* (2006.01)
(52) U.S. Cl. ........................ 524/285; 524/502
(58) Field of Classification Search ................ 524/285, 524/502
See application file for complete search history.

(56) References Cited

U.S. PATENT DOCUMENTS

| | | | |
|---|---|---|---|
| 2,940,949 A | 6/1960 | Mullin et al. ............... 260/31.4 |
| 3,654,007 A | 4/1972 | Winstanley et al. ......... 156/132 |
| 3,825,515 A | 7/1974 | Lucas et al. ........... 260/31.8 M |
| 3,951,887 A | 4/1976 | Tanimura et al. .............. 260/3 |
| 3,968,198 A | 7/1976 | Honda et al. ................ 264/343 |
| 3,993,847 A | 11/1976 | Kondo ........................ 428/451 |
| 4,038,220 A | 7/1977 | Thompson ..................... 260/3 |
| 4,054,561 A | 10/1977 | Strauss et al. |
| 4,061,835 A | 12/1977 | Poppe et al. ................. 428/522 |
| 4,078,114 A | 3/1978 | Aronoff et al. |
| 4,260,541 A | 4/1981 | Kolinsky et al. |
| 4,281,077 A | 7/1981 | Hirzy |
| 4,376,711 A | 3/1983 | Shaub ................... 252/32.7 E |
| 4,472,537 A | 9/1984 | Johnson et al. ............. 523/160 |
| 4,550,147 A | 10/1985 | Oohara .................... 525/332.6 |
| 4,588,761 A | 5/1986 | Thoma et al. ................. 524/38 |
| 4,645,788 A | 2/1987 | Okumoto et al. |
| 4,656,214 A | 4/1987 | Wickson |
| 4,683,250 A | 7/1987 | Mikami ........................ 522/33 |
| 4,789,381 A | 12/1988 | Oshiyama et al. ........... 8/115.6 |
| 4,978,392 A | 12/1990 | Kilbarger et al. ............. 106/95 |
| 4,978,716 A | 12/1990 | Flynn et al. ................. 525/195 |
| 5,021,490 A | 6/1991 | Vyvoda et al. |
| 5,057,566 A | 10/1991 | Kobayashi et al. ......... 524/297 |
| 5,071,899 A | 12/1991 | Wozniak ..................... 524/314 |
| 5,169,716 A | 12/1992 | Croft et al. |
| 5,290,886 A * | 3/1994 | Ellul .......................... 524/515 |
| 5,298,539 A | 3/1994 | Singh et al. ................... 524/92 |
| 5,380,786 A | 1/1995 | Greenlee et al. |
| 5,428,089 A | 6/1995 | Ishikawa et al. ............ 524/188 |
| 5,604,277 A | 2/1997 | Osborn |
| 5,605,955 A | 2/1997 | Hirai ........................... 524/588 |
| 5,792,805 A | 8/1998 | Williams ..................... 524/100 |
| 5,922,808 A | 7/1999 | Hanada et al. |
| 5,973,045 A | 10/1999 | Dowling et al. ............. 524/270 |
| 5,985,963 A | 11/1999 | D'Sidocky et al. ......... 524/105 |
| 6,111,004 A | 8/2000 | Biesiada et al. |
| 6,127,512 A | 10/2000 | Asrar et al. .................. 528/272 |
| 6,262,180 B1 | 7/2001 | Klun et al. .................. 525/199 |
| 6,326,426 B1 | 12/2001 | Ellul ........................... 524/270 |
| 6,369,264 B2 | 4/2002 | Day et al. |
| 2002/0010275 A1 | 1/2002 | Maly et al. .................. 525/177 |
| 2003/0171471 A1 | 9/2003 | Pritschins et al. .......... 524/306 |
| 2003/0220426 A1 | 11/2003 | Wentworth et al. ......... 524/284 |
| 2003/0220427 A1 | 11/2003 | Wentworth et al. ......... 524/284 |
| 2004/0072934 A1 | 4/2004 | O'Rourke .................... 524/293 |

FOREIGN PATENT DOCUMENTS

| | | |
|---|---|---|
| CA | 2408772 | 4/2003 |
| EP | 0 073 174 A1 | 3/1982 |
| EP | 0 450 105 A1 | 10/1991 |
| EP | 0 704 491 | 4/1996 |
| EP | 1 022 306 A1 | 7/2000 |
| EP | 1 304 210 | 4/2003 |
| FR | 2 417 522 | 9/1979 |
| GB | 1 045 577 | 10/1966 |
| JP | 06223316 | 4/1996 |

OTHER PUBLICATIONS

International (PCT) Search Report for PCT/US03/21462 dated Nov. 27, 2003.
International Preliminary Examination Report for PCT/US03/21642 dated Jun. 18, 2004.

* cited by examiner

*Primary Examiner*—Cephia D. Toomer
(74) *Attorney, Agent, or Firm*—Marshall, Gerstein & Borun LLP

(57) ABSTRACT

A thermoplastic polymer/elastomer composite composition including one or more thermoplastic polymers, a natural or synthetic rubber, and a long chain cyclic dimerate ester and/or long chain cyclic trimerate ester plasticizer.

26 Claims, No Drawings

LOW POLARITY DIMERATE AND TRIMERATE ESTERS AS PLASTICIZERS FOR THERMOPLASTIC POLYMER/ELASTOMER COMPOSITES

CROSS REFERENCE TO RELATED APPLICATION

This claims the benefit under 35 U.S.C. §119(e) of U.S. Provisional Patent Application Ser. No. 60/396,453, filed Jul. 17, 2002, the disclosure of which, in its entirety, is incorporated herein by reference.

TECHNICAL FIELD

The present disclosure is directed to low polarity dimerate and/or trimerate esters for plasticizing thermoplastic/elastomer composite compositions including one or more thermoplastic polymers and one or more natural and/or synthetic rubbers.

BACKGROUND

A number of thermoplastic polymers, elastomers, and their blends (thermoplastic/elastomer composite compositions) are very difficult to plasticize. In particular, thermoplastic/elastomer composite compositions that include one or more thermoplastic polymers and one or more elastomers, such as EPDM, are difficult to plasticize because it is difficult to find plasticizers that are sufficiently compatible with the composite compositions. Consequently, exuding (bleeding) of plasticizer to the surfaces of an article comprising the thermoplastic/elastomer composite composition frequently occurs upon cooling and crystallization of the composite composition.

Hydrocarbon-based processing oils such as naphthenic oils or paraffinic oils are usually used to plasticize thermoplastic/elastomer composite compositions containing elastomers such as EPDM. While hydrocarbon-based processing oils can be used to plasticize such composite compositions with partial success, the resulting plasticized compositions lack advantageous low temperature properties. Moreover, the processing oils have a tendency to exude (bleed) to the surfaces of articles manufactured from composite compositions. Attempts to use conventional linear dibasic acid esters, such as dioctyl adipate or di-2-ethylhexyl sebacate, or phthalate esters, such as di-2-ethylhexyl phthalate, have also been unsuccessful since such conventional ester plasticizers ate either incompatible with composite compositions, resulting in exudation of the plasticizer, or are too volatile for many thermoplastic/elastomer composite composition uses.

U.S. Pat. No. 5,290,886 teaches using organic ester plasticizers to plasticize thermoplastic elastomers comprising a blend of a thermoplastic polyolefin and an elastomer to lower the glass transition temperature ($T_g$) of both the elastomer and the polyolefin phases and to improve impact strength at low temperatures. The '886 patent neither discloses nor suggests using the cyclic dimerate and/or cyclic trimerate esters disclosed herein, and states that "polymeric dibasic esters and aromatic esters were found to be significantly less effective" (column 3, lines 62–64).

Surprisingly and unexpectedly, particular dimerate and/or trimerate esters designed to have very low polarity act as efficient plasticizers for thermoplastic/elastomer composite compositions. The resulting plasticized compositions have excellent low temperature properties and exhibit little or no tendency of the plasticizer to exude or bleed to a surface of the composite composition. Using the low polarity dimerate and/or trimerate esters as a plasticizer gives the thermoplastic/elastomer composite compositions an advantageous balance of flexibility, impact resistance, and strength.

SUMMARY OF THE DISCLOSURE

In brief, the use of long chain cyclic dimerate and/or trimerate ester plasticizers formed from di-, and/or tri-carboxylic acids, reacted with an alcohol containing a $C_3$–$C_{24}$ alkyl group, in a composite composition comprising a natural or synthetic vulcanizable rubber and one or more thermoplastic polymers, unexpectedly improves the low temperature properties of the plasticized composite composition in applications such as, belts, e.g., conveyor belts, automotive drive train belts, and transmission belts, hoses, motor mounts, gaskets, and the like. Additionally, by adding one or more long chain cyclic dimerate and/or trimerate esters (di-, and/or tri-esters) in accordance with the disclosure to a thermoplastic/elastomer composite composition, particularly dimerate esters formed by reacting the dimers and/or trimers of $C_{18}$ fatty acids with $C_3$–$C_{24}$ alcohols, preferably, $C_3$–$C_1$ alcohols, more preferably, $C_6$–$C_{18}$ alcohols, the low temperature characteristics of the composite composition are surprisingly improved. Preferably, the long chain cyclic dimerate and/or trimerate ester plasticizers are formed by reacting a $C_3$–$C_{18}$ alcohol with a mixture of mono-, di-, and tri-fatty acids, e.g., primarily $C_{18}$ carboxylic acids, and their-dimers and trimers.

DETAILED DESCRIPTION OF THE PREFERRED EMBODIMENTS

The long chain cyclic dimerate and/or trimerate ester plasticizers described herein are added to a combination of one or more thermoplastic polymers and one or more natural or synthetic rubbers, preferably together with a vulcanizing agent for the rubber component. The cyclic dimerate and/or trimerate ester(s) can be added to the thermoplastic polymer(s), or to the elastomer(s), or to the combination of thermoplastic polymer(s) and elastomer(s). Surprisingly, the long chain cyclic ester plasticizers disclosed herein significantly increase the low temperature properties of the resultant plasticized composite compositions and provide an excellent and unexpected balance of flexibility, impact resistance, and strength to the composite compositions.

The cyclic esters may be diesters, triesters, or mixtures thereof, that may include saturated or unsaturated hydrocarbon chains, straight chain or branched, having zero to six double bonds in the hydrocarbon chains. While cyclic monoesters are less preferred, they also may successfully be used in accordance with the present disclosure.

Many of the cyclic diester and/or cyclic triester materials are formed from self reaction of naturally derived fatty acid mixtures containing oleic, linoleic, and linolenic acids, and consequently are blends of mono-, di-, and tri-carboxylic acid esters. The ester blends may also include additional compounds that do not adversely affect the advantages imparted to the thermoplastic polymer/elastomer composite composition by the subject cyclic dimerate and/or trimerate esters described herein.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The cyclic diesters, referred to herein as dimerates, have a formula I, as follows:

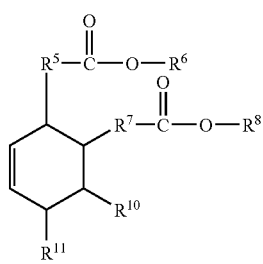

(I)

wherein $R^5$ and $R^7$, same or different, are $C_3$–$C_{24}$, preferably $C_6$–$C_{24}$ hydrocarbon chains, more preferably $C_8$–$C_{18}$, straight chain or branched, either saturated or containing 1 to 6, preferably 1 to 3, carbon-to-carbon double bonds;

$R^6$ and $R^8$, same or different, are $C_3$–$C_{24}$ alkyl, preferably $C_3$–$C_{18}$ alkyl, more preferably $C_6$–$C_{18}$ alkyl, straight chain or branched, saturated, or unsaturated containing 1 to 3 carbon-to-carbon double bonds; and $R^{10}$ and $R^{11}$, same or different, are a $C_3$–$C_{24}$, preferably $C_3$–$C_{18}$, more preferably $C_6$–$C_{18}$ saturated hydrocarbon chain, straight chain or branched; or an unsaturated $C_3$–$C_{24}$, preferably $C_3$–$C_{18}$, more preferably $C_6$–$C_{18}$ hydrocarbon chain, straight chain or branched, containing 1 to 6, preferably 1 to 3, carbon-to-carbon double bonds.

The cyclic tri-esters, referred to herein as trimerates, have a formula II, as follows:

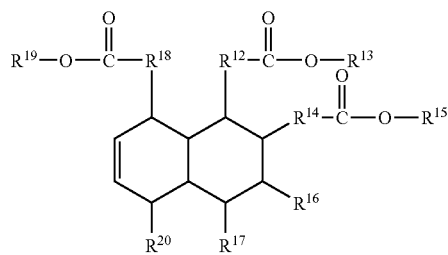

(II)

wherein $R^{12}$, $R^{14}$ and $R^{18}$, same or different, are a $C_3$–$C_{24}$, preferably $C_6$–$C_{24}$, more preferably $C_8$–$C_{18}$ hydrocarbon chain, straight chain or branched, either saturated or containing 1 to 6, preferably 1 to 3, carbon-to-carbon double bonds;

$R^{13}$, $R^{15}$ and $R^{19}$, same or different, are $C_3$–$C_{24}$ alkyl, preferably $C_3$–$C_{18}$ hydrocarbon chains, more preferably $C_6$–$C_{18}$ alkyl, straight chain or branched, saturated, or unsaturated containing 1 to 3 carbon-to-carbon double bonds; and $R^{16}$, $R^{17}$ and $R^{20}$, same or different, are $C_3$–$C_{24}$, preferably $C_3$–$C_{18}$ saturated hydrocarbon chains, more preferably $C_6$–$C_{18}$, straight chain or branched; or unsaturated $C_3$–$C_{24}$, preferably $C_3$–$C_{18}$, hydrocarbon chains, more preferably $C_6$–$C_{18}$, straight chain or branched, containing 1 to 6, preferably 1 to 3, carbon-to-carbon double bonds.

The low polarity of the cyclic ester compounds disclosed herein is important for successfully plasticizing thermoplastic/elastomeric composite compositions. Low polarity cyclic ester compounds, e.g., ester compounds formed from dimer acids having only acidic carboxyl groups (i.e., the dimer acids do not contain other non-acidic hydroxyl substituents) and alcohols having a single hydroxyl group are preferred. Similarly, it is preferred that $R^6$, $R^8$, $R^{13}$, $R^{15}$ and $R^{19}$ of formulas I and II do not contain hydroxyl substituents. Dimerate esters formed from dimer acids and glycol type alcohols, for example, glycol alcohols such as ethylene glycol, diethylene glycol, triethylene glycol, and other polyethylene glycols, would be too polar to plasticize thermoplastic/elastomeric composite compositions while simultaneously providing superior low temperature properties. Additionally, esters prepared by reacting dimer acids with the glycol functionalized monomers and oligomers set forth in U.S. Pat. No. 4,054,561 would also be too polar for use as plasticizers for composite compositions.

Useful cyclic diesters falling within formula I include dimerate ester structures formed by the reaction of a $C_{36}$ dimer acid derived from tall oil fatty acids and $C_3$–$C_{24}$, preferably $C_3$–$C_{18}$, more preferably $C_6$–$C_{18}$ alcohol, straight chain or branched, saturated, or unsaturated containing 1 to 3 carbon-to-carbon double bonds. Examples of such cyclic esters include the following structures, wherein the dimer acid corresponding to structure A is formed by self reaction of linoleic acid, the dimer acid corresponding to structure B is formed by reacting linoleic acid with oleic acid, and the dimer acid corresponding to structure C is formed by reacting linoleic acid with linolenic acid:

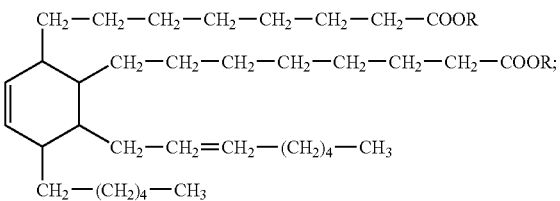

(A)

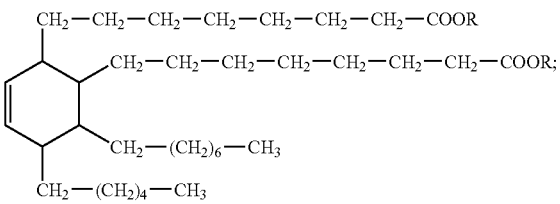

(B)

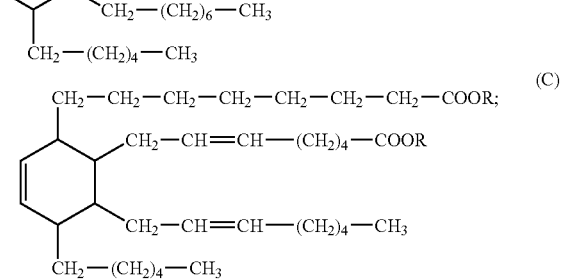

(C)

wherein each R, same or different, in formulas (A), (B), and (C) is a $C_3$–$C_{24}$ radical, preferably $C_3$–$C_{18}$, more preferably $C_6$–$C_{18}$, straight chain or branched, saturated, or unsaturated containing 1 to 3 carbon-to-carbon double bonds.

RX-13804, RX-13824, and RX-13892 are additional examples of dimerate esters in accordance with formula I. RX-13804 is formed by the reaction of a predominantly $C_{36}$ dimer acid with 2-ethylhexyl alcohol. RX-13824 is formed by the reaction of a predominantly $C_{36}$ dimer acid with tridecyl alcohol. RX-13892 is formed by the reaction of a predominantly $C_{36}$ dimer acid with oleyl alcohol.

A representative example of a triester (trimerate ester) in accordance with formula II is the following structure (D):

13-docosenoic (CIS) ($C_{22-1}$); docosatetraenoic ($C_{22-4}$); 4,8,12,15,19-docosapentaenoic ($C_{22-5}$); docosahexaenoic ($C_{22-6}$); tetracosenoic ($C_{24-1}$); and 4,8,12,15,18,21-tetracosahexaenoic ($C_{24-6}$).

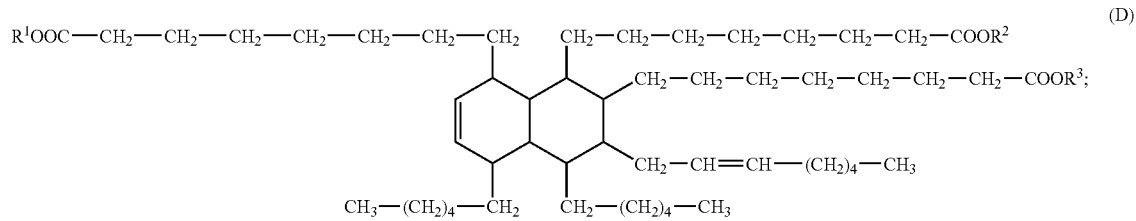

(D)

wherein each $R^1$, $R^2$, and $R^3$, same or different, is a $C_3$–$C_{24}$ radical, preferably $C_3$–$C_{18}$, more preferably $C_6$–$C_{18}$, straight chain, or branched, saturated, or unsaturated containing 1 to 3 carbon-to-carbon double bonds.

In the description, the term dimerate is sometimes used when referring to blends including components having structures in accordance with both formulas I and II (i.e., dimerates and trimerates).

The cyclic ester plasticizers of formulas I, II, or mixtures thereof are typically added to a composite composition in an amount of about 0.1 parts to about 45 parts by weight, preferably from about 5 parts to about 40 parts, more preferably from about 10 parts to about 35 parts per 100 parts by weight of the thermoplastic/elastomer composite composition.

A particularly useful blend of carboxylic acids for forming cyclic esters in accordance with the invention is a blend of carboxylic acids known as dimer acid, CAS#: 61788-89-4, which is a blend including, primarily, $C_{36}$ and $C_{54}$ dimer and trimer acids, and predominantly (more than 50% by weight) $C_{36}$ dimer acid.

The fatty acid residues or hydrocarbon chains $R^5$, $R^7$, $R^{12}$, $R^{14}$ and $R^{18}$ of the esters of formulas I and II can be any $C_3$–$C_{24}$, preferably, $C_6$–$C_{24}$, more preferably $C_8$–$C_{18}$, hydrocarbon chain, either saturated or containing 1 to 6, preferably 1 to 3, carbon-to-carbon double bonds, derived from animal or vegetable fatty acids such as butter; lard; tallow; grease; herring; menhaden; pilchard; sardine; babassu; castor; coconut; corn; cottonseed; jojoba; linseed; oiticica; olive; palm; palm kernel; peanut; rapeseed; safflower; soya; sunflower; tall; and/or tung. Examples are the hydrocarbon chain residues from the following fatty acids, where the number in parentheses indicates the number of carbon atoms, and the number of double bonds, e.g., ($C_{24-6}$) indicates a hydrocarbon chain having 24 carbon atoms and 6 double bonds: hexanoic ($C_{6-0}$); octanoic ($C_{8-0}$); decanoic ($C_{10-0}$); dodecanoic ($C_{12-0}$); 9-dodecenoic (CIS) ($C_{12-1}$); tetradecanoic ($C_{14-0}$); 9-tetradecenoic (CIS) ($C_{14-1}$); hexadecanoic (CIS) ($C_{16-0}$); 9-hexadecenoic (CIS) ($C_{16-1}$); octadecanoic ($C_{18-0}$); 9-octadecenoic (CIS) ($C_{18-1}$); 9,12-octadecadienoic (CIS, CIS) ($C_{18-2}$); 9,12,15-octadecatrienoic (CIS, CIS, CIS) ($C_{18-3}$); 9,11,13-octadecatrienoic (CIS, TRANS, TRANS) ($C_{18-3}$); octadecatetraenoic ($C_{18-4}$); eicosanoic ($C_{20}$); 11-eicosenoic (CIS) ($C_{20-1}$); eicosadienoic ($C_{20-2}$); eicosatrienoic ($C_{20-3}$); 5,8,11,14-eicosatetraenoic ($C_{20-4}$); eicosapentaenoic ($C_{20-5}$); docosanoic ($C_{22}$);

Commercially available blends of useful polybasic acids that can be reacted with $C_3$–$C_{24}$, preferably $C_3$–$C_{18}$, more preferably $C_6$–$C_{18}$ alcohols, straight chain or branched, saturated, or unsaturated containing 1 to 3 carbon-to-carbon double bonds to produce the dimerate and trimerate esters, as blends, include the following: EMPOL® 11010 Dimer Acid; EMPOL® 1014 Dimer Acid; EMPOL® 1016 Dimer Acid; EMPOL® 1018 Dimer Acid; EMPOL® 1022 Dimer Acid; EMPOL® 1024 Dimer Acid; EMPOL® 1040 Trimer Acid; EMPOL® 1041 Trimer Acid; EMPOL® 1052 Polybasic Acid; and similar PRIPOL™ products from Uniqema as well as UNIDYME® products from Arizona Chemical.

Particularly useful long chain ester additives are made by reacting any of the long chain mono, dimer and/or trimer acids with one or more straight chain or branched $C_3$–$C_{24}$, preferably $C_3$–$C_{18}$, more preferably $C_6$–$C_{18}$ alcohols to produce the esters of formulas I and II. The above dimer, trimer, and polybasic acids are produced by dimerizing, trimerizing, and polymerizing (oligomerizing) long chain carboxylic acids from fatty acids. The fatty acids are typically mixtures. For example, the dimer acid produced from a $C_{18}$ carboxylic acid (e.g., a mixture of stearic, oleic, linoleic, and linolenic) will typically result in a blend of numerous cyclic dimerate and trimerate esters, as in formulas I and II, some saturated and some containing hydrocarbon chains having 1 to 6, generally 1 to 3, carbon-to-carbon double bonds. Any one, or any blend, of the esters that includes the cyclic dimerate and/or cyclic trimerate esters of formulas I or II will function to plasticize thermoplastic polymer/elastomer composite materials, and provide a balance of flexibility, strength, and low temperature properties with essentially no bleeding of the plasticizer to the surface of the composite composition. Particularly, the composite compositions described herein are characterized in that the low temperature properties are improved to provide the composite compositions a balance of good flexibility and strength at low temperatures.

The dimerate and trimerate esters of the disclosure may be used to plasticize thermoplastic polymer/elastomer composite compositions. The terms thermoplastic alloys and thermoplastic vulcanizates also describe composite compositions in accordance with the disclosure.

As used herein, thermoplastic polymers generally include synthetic high polymers that soften when exposed to heat and return to their original state when cooled to room temperature. More specifically, thermoplastic polymers useful in the composite compositions described herein include polyvinyl chlorides, nylons, propylene/(α-olefin copolymers, polyethylenes, ethylene/α-olefin copolymers, polyurethane prepolymers, polystyrenes such as styrene/ethylene and hydrogenated styrene/butadiene block copolymers, polypropylenes, cellulosic resins, and acrylic resins. Preferably, the plasticizers described herein plasticize composite compositions including thermoplastics such as polypropylenes, propylene/α-olefin copolymers, and ethylene/α-olefin copolymers.

Rubbers useful in the composite compositions described herein can be natural rubbers (NR) and/or synthetic rubbers. Synthetic rubbers include homopolymers of conjugated diene compounds, such as isoprene, butadiene, chloroprene and the like, for example, polyisoprene rubber (IR), polybutadiene rubber (BR), polychloroprene rubber and the like; copolymers of the above described conjugated diene compounds with vinyl compounds, such as styrene, acrylonitrile, vinyl pyridine, acrylic acid, methacrylic acid, alkyl acrylates, alkyl methacrylates and the like, for example, styrene-butadiene copolymeric rubber (SBR), vinylpyridine-butadiene-styrene copolymeric rubber, acrylonitrile-butadiene copolymeric rubber, acrylic acid-butadiene copolymeric rubber, methacrylic acid-butadiene copolymeric rubber, methyl acrylate-butadiene copolymeric rubber, methyl methacrylate-butadiene copolymeric rubber, acrylonitrile-butadiene-styrene terpolymer, and the like; copolymers of olefins, such as ethylene, propylene, isobutylene and the like with dienes, for example isobutylene-isoprene copolymeric rubber (IIR); copolymers of olefins with non-conjugated dienes, for example, ethylene-propylene-diene rubbers (EPDM) such as ethylene-propylene-cyclopentadiene terpolymer, ethylene-propylene-5-ethylidene-2-norbornene terpolymer and ethylene-propylene-1,4-hexadiene terpolymer; polyalkenamer obtained by ring opening polymerization of cycloolefins, for example, polypentenamer; rubbers obtained by ring opening polymerization of oxirane ring, for example, polyepichlorohydrin rubber and polypropylene oxide rubber which can be vulcanized with sulfur, and the like. Furthermore, halides of the above-described various rubbers, for example, chlorinated isobutylene-isoprene copolymeric rubber (CI-IIR), brominated isobutylene-isoprene copolymeric rubber (Br-IIR), fluorinated polyethylene, and the like are included.

Of course, the plasticizers in accordance with the present disclosure can be applied to composite compositions comprising other rubbers. Additionally, all of these rubbers may be kneaded with compounding agents conventionally used for compounding with rubber, for example, fillers, such as carbon black, silica, calcium carbonate, lignin and the like, softening agents, such as mineral oils, vegetable oils, prior to vulcanization.

In order to cure a rubber containing composite composition, a vulcanizing agent such as a sulfur or peroxide vulcanizing agent is dispersed throughout the composition. The amount of vulcanizing agent, e.g., sulfur, in the composition is typically from about 2 to about 8 parts, for example from about 3, to about 6, by weight per 100 parts by weight of natural and/or synthetic rubber, but lesser or larger amounts, for example from about 1 to about 10 parts on the same basis, may be employed. A preferred range is from about 2.5 to about 6 parts per 100 parts by weight of rubber. Representative examples of sulfur vulcanizing agents include elemental sulfur ($S_8$), amine disulfides, polymeric polysulfides, and sulfur olefin adducts. Preferably, the sulfur vulcanizing agent is elemental sulfur.

The term "vulcanization" used herein means the introduction of three dimensional cross-linked structures between rubber molecules. Thus, thiuram vulcanization, peroxide vulcanization, quinoid vulcanization, resin vulcanization, metal salt vulcanization, metal oxide vulcanization, polyamine vulcanization, radiation vulcanization, hexamethylenetetramine vulcanization, urethane cross-linker vulcanization, and the like are included in addition to sulfur vulcanization which is usual and most important.

Accelerators may be used to control the time and/or temperature required for vulcanization and to improve the properties of the vulcanizate. The accelerator(s) may be used in total amounts ranging from about 0.3 parts to about 4 parts, for example about 0.3 parts to about 1.5 parts, preferably from about 0.4 parts to about 1.0 parts and more preferably from about 0.5 parts to about 0.8 parts by weight per 100 parts by weight of natural and/or synthetic rubbers. Suitable types, of accelerators that may be used are amines, disulfides, guanidines, thioureas, thiazoles, thiurams, sulfenamides, dithiocarbamates and xanthates. If included in the rubber containing composite composition, the primary accelerator preferably is typically a sulfenamide. If a second accelerator is used, the secondary accelerator is preferably a guanidine, dithiocarbamate or thiuram compound. Specific examples of vulcanization accelerators which can be used in the rubber containing composite compositions described herein are thiazole-based accelerators, for example 2-mercaptobenzothiazole, bis(2-benzo-thiazolyl)disulphide, 2(2', 4'-dinitro-phenylthio)benzothiazole, benzothiazole-2-sulphenamides for instance N-isopropyl-benzothiazole-2-sulphenamide, N-tert-butyl-benzothiazole-2-sulphenamide, N-cyclo-hexylbenzo-thiazole-2-sulphen-amide, and 2(morpholinothio)benzothiazole, and thiocarbamylsulphenamides, for example N,N-dimethyl-N',N'-dicyclohexylthiocarbamoylsulphenamide and N(morpholinothiocarbonylthio)morpholine.

The commonly employed carbon blacks used in conventional rubber compounding applications can be used as the carbon black in the plasticizers in accordance with this disclosure. Representative examples of such carbon blacks include N110, N121, N220, N231, N234, N242, N293, N299, S315, N326, N330, M332, N339, N343, N347, N351, N358 and N375.

The rubber containing composite compositions described herein are compounded by methods generally known in the rubber compounding art, such as mixing the various sulfur-vulcanizable or peroxide-vulcanizable constituent rubbers with various commonly used additive materials such as, for example, sulfur donors, curing aids, such as activators and retarders and processing additives, such as oils, resins including tackifying resins and other conventional plasticizers, fillers, pigments, fatty acid, zinc oxide, waxes, antioxidants and antiozonants, retarders and peptizing agents.

Typical amounts of zinc oxide comprise about 2 parts to about 5 parts per 100 parts by weight of total polymer. Typical amounts of waxes comprise about 1 part to about 5 parts per 100 parts by weight of total polymer. Often microcrystalline waxes are used. Typical amounts of retarders range from about 0.05 parts to about 2 parts per 100 parts by weight of total polymer. Typical amounts of peptizers comprise about 0.1 parts to about 1 part per 100 parts by weight of total polymer. Typical peptizers may be, for example, pentachlorothiophenol and dibenzamidodiphenyl disulfide.

Vulcanization of the rubber containing composite compositions described herein is generally carried out at conventional temperatures ranging from about 100° C. to about 200° C. Preferably, the vulcanization is conducted at temperatures ranging from about 110° C. to about 180° C. Any of the usual vulcanization processes may be used such as heating in a press or mold, heating with superheated steam or hot air or in a salt bath.

Upon vulcanization of the rubber containing composite composition at a temperature ranging from about 100° C. to about 200° C., the rubber containing composite composition can be used for various purposes. For example, the vulcanized rubber containing composite composition may be in the form of belts, hoses, gaskets and air springs.

The plasticizers in accordance with the present disclosure may be better understood by reference to the following examples in which parts and percentages are by weight unless otherwise indicated.

Procedure

The following general procedure was used in the preparation of thermoplastic/elastomer composite compositions disclosed in the following tables. The thermoplastic polymer(s) and rubber component(s) were placed in a heated internal mixer, with an appropriate portion of a cyclic ester plasticizer in accordance with the disclosure (and other desired additives). Typically, approximately one third of the total plasticizer amount was added at this time to aid in mixing. The mixture was heated to a temperature sufficient to melt the polyolefin component and was then masticated. After a maximum of mixing torque indicated that vulcanization had occurred, the remaining portion of the plasticizer was added, and mixing was continued until the desired degree of vulcanization was achieved: The order of addition of the various components may vary.

More specifically, the rubber compound(s), the thermoplastic polymer(s), a phenolic curing agent and additives were blended in an electrically heated Haake mixer at a mixing speed of about 77 rpm and at a temperature ranging between about 120° C. to about 190° C. Before melting of the polyolefin component, a Lewis acid was added, and mixing was continued. The mixing temperature as a function of time was observed, and the onset of vulcanization of the rubber portion was accompanied by a rapid increase in mixing torque at around 180° C. The crosslinking of the rubber component causes the increase in viscosity of the mixture and the need for additional energy to mix the thermoplastic vulcanizate. Mixing was stopped when the torque measurement was relatively constant over time. The compositions were removed from the mixer and sheets were molded at about 190° C. and used for measurement of physical properties.

Results

Table I compares the effectiveness of dimerate plasticizers in accordance with the disclosure with a conventional linear dibasic acid ester, dioctyl sebacate. The dimerate esters plasticized a thermoplastic/elastomer blend comprising polypropylene and EPDM about as well as, and in some cases better than, the conventional plasticizer DOS. For example, the fusion viscosity values for the composites plasticized with RX 13824 and RX 13804 demonstrate the efficacy of the disclosed plasticizers.

TABLE I

| Example | 1 | 2 | 3 | 4 |
|---|---|---|---|---|
| PDC 1280 | 50.0 | → | → | → |
| Royalene IM7200 | 50.0 | → | → | → |
| Kadox 930 | 2.0 | → | → | → |
| Stearic Acid | 0.5 | → | → | → |
| DOS | 15 | — | — | — |
| RX 13824 | — | 15 | — | — |
| RX 13804 | — | — | 15 | — |
| TDT | — | — | — | 15 |
| TOTAL | 117.5 | → | → | → |
| Mill Addition | | | | |
| Trigonox | 0.5 | → | → | → |
| TOTAL | 118.0 | → | → | → |
| Major Variable | DOS | RX 13824 | RX 13804 | TDT |
| Original Physical Properties | | | | |
| Stress @ 100% Elong. MPa | 8.8 | 8.5 | 8.9 | 8.0 |
| psi | 1276.4 | 1232.8 | 1290.9 | 1160.3 |
| Stress @ 200% Elong. MPa | 9.4 | 8.8 | 9.4 | 8.5 |
| Stress @ 300% Elong. MPa | 10.0 | n/a | 8.1 | 9.0 |
| Tensile Strength, MPa | 12.2 | 10.4 | 10.8 | 11.7 |
| psi | 1772 | 1510 | 1561 | 1700 |
| Elongation @ Break, % | 538 | 358 | 404 | 555 |
| Toughness, Psi | 7619 | 4643 | 5455 | 7293 |
| Harness Duro A, pts. | | | | |
| Specific Gravity | 0.914 | 0.912 | 0.914 | 0.910 |
| Clear Point, ° F., DOP-1201-010 | | | | |
| Fusion Viscosity, 77 RPM, 180 EC | | | | |
| Fusion Torque, mg | 1900 | 1400 | 1600 | 1800 |
| Fusion Temperature, EC | 193 | 190 | 190 | 193 |
| Melt Torque, mg | 715 | 733 | 739 | 683 |
| Energy kJ | 50 | 42 | 45 | 45 |

Table II compares the effectiveness of dimerate plasticizers in accordance with the disclosure with a conventional linear dibasic acid ester, dioctyl sebacate and with a conventional hydrocarbon-based processing oil, paraffinic oil. The dimerate esters plasticized a composite thermoplastic/elastomer blend comprising polypropylene and EPDM about as well as, and in some cases better than, the conventional plasticizers DOS and paraffinic oil. For example, the stress and fusion viscosity values for the composites plasticized with RX 13824 and RX 13804 demonstrate the efficacy of the disclosed plasticizers. An example illustrating the physical properties of an unplasticized composite composition is also included in Table II for comparison purposes.

TABLE II

| Example | 5 | 6 | 7 | 8 | 9 | 10 |
|---|---|---|---|---|---|---|
| PDC 1280 | 50.00 | → | → | → | → | → |
| Royalene IM7200 | 50.00 | → | → | → | → | → |
| Kadox 930 | 2.0 | → | → | → | → | → |
| Stearic Acid | 1.0 | → | → | → | → | → |
| DOS | — | 20.00 | — | — | — | — |
| RX 13824 | — | — | 20.00 | — | — | — |
| RX 13804 | — | — | — | 20.00 | — | — |
| TDT | — | — | — | — | 20.00 | — |
| Sunpar 2280 | — | — | — | — | — | 20.00 |
| Subtotal | 103.00 | 123.00 | → | → | → | → |
| Mill Addition | | | | | | |
| SP-1056 | | 5.00 | | | | |
| TOTAL | 108.00 | 128.00 | → | → | → | → |
| Major Variable | Uplasticized | DOS | RX 13824 | RX 13804 | TDT | Process Oil |
| Original Physical Properties | | | | | | |
| Stress @ 100% Elong. MPa | 16.4 | 9.4 | 8.8 | 8.7 | 8.3 | 10.2 |
| psi | 2379 | 1363 | 1276 | 1262 | 1204 | 1479 |
| Stress @ 200% Elong. MPa | na | 12.0 | 10.9 | 10.8 | 10.3 | 12.4 |
| Stress @ 300% Elong. Mpa | na | 15.2 | 13.4 | 13.1 | 12.6 | 14.9 |
| Tensile Strength, MPa | 21.1 | 20.6 | 19.2 | 18.4 | 18.9 | 18.2 |
| psi | 3059 | 2987 | 2780.0 | 2664.0 | 2738.0 | 2635.0 |
| Elongation @ Break, % | 262 | 407 | 445.0 | 451.0 | 468.0 | 387.0 |
| Toughness, Psi | 6478 | 7324 | 7598.0 | 7586.0 | 7731.0 | 6926.0 |
| Hardness Duro D, pts. | 52 | 35 | 37 | 36 | 35 | 39 |
| Fusion Viscosity, 77 RPM, 180 EC** | | | | | | |
| Fusion Torque, mg | 2400 | 1900 | 1900 | 1900 | 1900 | 1900 |
| Fusion Temperature, EC | 195 | 194 | 194 | 191 | 190 | 192 |
| Melt Torque, mg | 1040 | 604 | 600 | 617 | 525 | 668 |
| Energy, kJ | 67.4 | 45.6 | 43.3 | 45.1 | 41.6 | 46.3 |

**Plasticizer added after fusion peak

Table III provides glass transition temperature data for several plasticized composite compositions, and demonstrates that plasticizers in accordance with the disclosure plasticize composite compositions better than conventional-plasticizing compositions such as paraffinic oils. The glass transition temperature for both the rubber and plastic components illustrates the efficacy of a plasticizer in accordance with the invention in improving the flow temperature behavior of a thermoplastic/elastomer composite composition.

Table III also contains data (see example 12 weight change, % after heat aging) illustrating the volatility of conventional dibasic linear esters such as DOS. The heat aging data demonstrates that the dimerate esters RX-13804 and RX-13824 have a marked improvement over conventional dibasic linear esters such as DOS and monoester compounds such as tridecyl tallate (TDT) because significantly lower weight losses and hardness changes are observed in the dimerate ester formulations.

TABLE III

| Example | 11 | 12 | 13 | 14 | 15 | 16 | 17 |
|---|---|---|---|---|---|---|---|
| PDC 1280 | 50.00 | → | → | → | → | → | → |
| Royalene IM7200 | 50.00 | → | → | → | → | → | → |
| Kadox 930 | 1.00 | → | → | → | → | → | → |
| Stearic Acid | 1.00 | → | → | → | → | → | → |
| SnCl$_2$·2H$_2$O | 0.50 | → | → | → | → | → | → |
| DOS | — | 30.00 | — | — | — | — | — |
| RX-13824 | — | — | 30.00 | — | — | — | — |
| RX-13804 | — | — | — | 30.00 | — | — | — |
| TDT | — | — | — | — | 30.00 | — | — |
| Sunpar 150 | — | — | — | — | — | 30.00 | — |
| RX-13892 | — | — | — | — | — | — | 30.00 |
| SP-1045 | 5.00 | → | → | → | → | → | → |
| Total | 107.50 | 137.50 | 137.50 | 137.50 | 137.50 | 137.50 | 137.50 |
| Major Variable | Un-plasticized | DOS | RX-13824 | RX-13804 | TDT | Sunpar 150 | RX-13892 |
| Original Physical Properties | | | | | | | |
| Stress @ 100% Elong., MPa | 14.7 | 8.2 | 7.9 | 8.6 | 7.4 | 8.1 | 7.6 |
| psi | 2132 | 1189 | 1146 | 1247 | 1073 | 1175 | 1102 |

TABLE III-continued

| Example | 11 | 12 | 13 | 14 | 15 | 16 | 17 |
|---|---|---|---|---|---|---|---|
| Stress @ 200% Elong., MPa | 17.2 | 10.9 | 10.6 | 11.4 | 9.6 | 10.6 | 9.9 |
| Stress @ 300% Elong., MPa |  | 14.4 | 13.8 | 14.8 | 12.1 | 13.8 | 12.6 |
| Tensile Strength, MPa | 28.0 | 19.3 | 21.9 | 20.5 | 19.7 | 22.1 | 18.9 |
| psi | 4065 | 2803 | 3175 | 2971 | 2855 | 3200 | 2735 |
| Elongation @ Break, % | 384 | 390 | 443 | 399 | 469 | 443 | 436 |
| Toughness, psi | 10037 | 6285 | 7575 | 6787 | 7384 | 7626 | 6784 |
| Hardness Duro A, pts. | 50 | 31 | 30 | 31 | 30 | 33 | 31 |
| Specific Gravity | 0.910 | 0.914 | 0.911 | 0.910 | 0.906 | — | — |
| Air Oven Aging, 2 wks. @ 125° C. |  |  |  |  |  |  |  |
| Stress @ 100% Elong., MPa | 14.6 | 11.4 | 7.5 | 8.0 | 8.8 | 8.2 | 7.6 |
| psi | 2118 | 1654 | 1088 | 1160 | 1276 | 1189 | 1102 |
| Stress Change, % | −1 | 39 | −5 | −7 | 19 | 1 | 0 |
| Tensile Ultimate @ Break, MPa | 25.5 | 25.8 | 19.5 | 19.1 | 26.5 | 22.6 | 18.2 |
| psi | 3693 | 3747 | 2825 | 2767 | 3847 | 3271 | 2645 |
| Tensile Change, % | −9 | 34 | −11 | −7 | 35 | 2 | −3 |
| Elongation @ Break, % | 346 | 401 | 434.5 | 397 | 511 | 417 | 422 |
| Elongation Change, % | −10 | 3 | −2 | −1 | 9 | −6 | −3 |
| Toughness, psi | 8641 | 8768 | 6941 | 6428 | 10108 | 7415 | 6579 |
| Toughness Change, % | −14 | 40 | −8 | −5 | 37 | −3 | −3 |
| Hardness Duro A, pts | 50 | 50 | 34 | 34 | 39 | 35 | 35 |
| Hardness Change, pts | 0 | 19 | 4 | 3 | 9 | 2 | 4 |
| Weight Change, % | −0.3 | −21.6 | −1.5 | −1.3 | −12.5 | −0.8 | −1.7 |
| Glass Transition Temperature |  |  |  |  |  |  |  |
| Rubber $T_g$ (° C.) | −22 | −37 | −38 | −38 | −47 | −29 | — |
| Plastic $T_g$ (° C.) | 8 | −16 | −17 | −17 | −22 | 2 | — |

Table IV provides additional example formulations comparing the effectiveness of dimerate plasticizers with the conventional linear dibasic acid ester, dioctyl sebacate, and a conventional plasticizing processing oil. The dimerate esters plasticized a thermoplastic/elastomer blend comprising polypropylene and EPDM about as well as, and in some cases better than, the conventional plasticizer DOS. Additionally, the air oven aging data indicates that the conventional linear dibasic acid ester DOS is relatively volatile (e.g., greater weight loss) when compared with the dimerate ester plasticizers in accordance with the disclosure.

TABLE IV

| Example | 18 | 19 | 20 | 21 | 22 | 23 | 24 |
|---|---|---|---|---|---|---|---|
| PDC 1280 | 50.00 | → | → | → | → | → | → |
| Royalene IM7200 | 50.00 | → | → | → | → | → | → |
| Kadox 930 | 1.00 | → | → | → | → | → | → |
| Stearic Acid | 1.00 | → | → | → | → | → | → |
| $SnCl_2 \cdot 2H_2O$ | 1.00 | → | → | → | → | → | → |
| DOS | — | 20.00 | — | — | — | — | — |
| RX-13824 | — | — | 20.00 | — | — | — | — |
| RX-13804 | — | — | — | 20.00 | — | — | — |
| TDT | — | — | — | — | 20.00 | — | — |
| Sunpar 150 | — | — | — | — | — | 20.00 | — |
| RX-13892 | — | — | — | — | — | — | 20.00 |
| Subtotal | 103.00 | 123.00 | 123.00 | 123.00 | 123.00 | 123.00 | 123.00 |
| Mill Addition |  |  |  |  |  |  |  |
| SP-1045 | 5.00 | → | → | → | → | → | → |
| Total | 108.00 | 128.00 | 128.00 | 128.00 | 128.00 | 128.00 | 128.00 |
| Major Variable | Unplasticized | DOS | RX-13824 | RX-13804 | TDT | Process Oil | RX-13892 |
| Original Physical Properties |  |  |  |  |  |  |  |
| Stress @ 100% Elong., MPa | 14.7 | 9.2 | 9.1 | 9.0 | 8.9 | 9.8 | 8.5 |
| psi | 2132 | 1334 | 1320 | 1305 | 1291 | 1421 | 1233 |
| Stress @ 200% Elong., MPa | 17.2 | 12.1 | 11.7 | 11.6 | 11.6 | 12.5 | 10.8 |
| Stress @ 300% Elong., MPa | — | 15.7 | 14.9 | 14.8 | 14.7 | 15.8 | 13.6 |
| Tensile Strength, MPa | 28.0 | 22.1 | 24.2 | 23.7 | 21.3 | 20.4 | 20.7 |
| psi | 4065 | 3200 | 3517 | 3438 | 3083 | 2965 | 3002 |

TABLE IV-continued

| Example | 18 | 19 | 20 | 21 | 22 | 23 | 24 |
|---|---|---|---|---|---|---|---|
| Elongation @ Break, % | 384 | 400 | 443 | 439 | 416 | 381 | 442 |
| Toughness, psi | 10037 | 7268 | 8472 | 8231 | 7361 | 6928 | 7575 |
| Hardness Duro A, pts. | 50 | 35 | 36 | 36 | 35 | 40 | 35 |
| Specific Gravity | 0.910 | 0.910 | 0.911 | 0.914 | 0.909 | 0.910 | 0.912 |
| Melt Viscosity 77 RPM, 180° C. | | | | | | | |
| Fusion Torque, mg | 2844 | 1396 | 1121 | 1162 | 1233 | 1386 | — |
| Fusion Temperature, C | 168 | 160.7 | 170 | 168.7 | 160.7 | 167.6 | — |
| Melt Torque, mg | 1106 | 593 | 634 | 620 | 528 | 670 | — |
| Energy, kJ | 67.7 | 40.3 | 34.4 | 37.3 | 37.1 | 42.5 | — |
| Air Oven Aging, 2 wks. @ 125° C. | | | | | | | |
| Stress @ 100% Elong., MPa | 14.6 | 11.5 | 9.2 | 9.2 | 10.3 | 9.8 | 8.7 |
| psi | 2118 | 1668 | 1334 | 1334 | 1494 | 1421 | 1262 |
| Stress Change, % | −1 | 25 | 1 | 2 | 16 | 0 | 2 |
| Tensile Ultimate @ Break, MPa | 25.5 | 25.1 | 24.2 | 22.3 | 23.0 | 22.1 | 19.6 |
| psi | 3693 | 3642 | 3504 | 3234 | 3341 | 3212 | 2849 |
| Tensile Change, % | −9 | 14 | 0 | −6 | 8 | 8 | −5 |
| Elongation @ Break, % | 346 | 385.6 | 433 | 394 | 411 | 360 | 402 |
| Elongation Change, % | −10 | −4 | −2 | −10 | −1 | −6 | −9 |
| Toughness, psi | 8641 | 8393 | 8434 | 7359 | 8233 | 6848 | 6882 |
| Toughness Change, % | −14 | 15 | 0 | −11 | 12 | −1 | −9 |
| Hardness Duro A, pts | 50 | 50 | 39 | 39 | 44 | 40 | 37 |
| Hardness Change, pts | 0 | 15 | 3 | 3 | 9 | 0 | 2 |
| Weight Change, % | −0.3 | −15.8 | −1.4 | −1.3 | −10.0 | −0.8 | −1.5 |

Table V provides additional formulations incorporating plasticizers in accordance with the disclosure and compares the effectiveness of dimerate plasticizers with the conventional linear dibasic acid ester, dioctyl sebacate, and a conventional plasticizing processing oil.

TABLE V

| Example | 25 | 26 | 27 | 28 | 29 | 30 | 31 |
|---|---|---|---|---|---|---|---|
| PDC 1280 | 50.00 | → | → | → | → | → | → |
| Royalene IM7200 | 50.00 | → | → | → | → | → | → |
| Kadox 930 | 1.00 | → | → | → | → | → | → |
| Stearic Acid | 1.00 | → | → | → | → | → | → |
| $SnCl_2 \cdot 2H_2O$ | 0.50 | → | → | → | → | → | → |
| DOS | — | 10.00 | — | — | — | — | — |
| RX-13824 | — | — | 10.00 | — | — | — | — |
| RX-13804 | — | — | — | 10.00 | — | — | — |
| TDT | — | — | — | — | 10.00 | — | — |
| Sunpar 150 | — | — | — | — | — | 10.00 | — |
| RX13892 | — | — | — | — | — | — | 10.00 |
| Subtotal | 102.50 | 112.50 | 112.50 | 112.50 | 112.50 | 112.50 | 112.50 |
| Mill Addition | | | | | | | |
| SP-1045 | 5.00 | → | → | → | → | → | → |
| Total | 107.50 | 117.50 | 117.50 | 117.50 | 117.50 | 117.50 | 117.50 |
| Major Variable | Un-plasticized | DOS | RX-13824 | RX-13804 | TDT | Process Oil | RX-13892 |
| Original Physical Properties | | | | | | | |
| Stress @ 100% Elong., MPa | | 11.0 | 11.2 | 10.9 | 10.1 | 11.0 | 10.8 |
| psi | | 1595 | 1624 | 1581 | 1465 | 1595 | 1566 |
| Stress @ 200% Elong., MPa | | 14.0 | 14.1 | 13.5 | 12.4 | 13.8 | 13.6 |
| Stress @ 300% Elong., MPa | | 18.4 | 18.2 | 17 | 15.5 | 17.6 | 17.3 |
| Tensile Strength, MPa | | 27.2 | 24.4 | 21.5 | 23.1 | 27.8 | 25.9 |
| psi | | 3940 | 3543 | 3116 | 3349 | 4025 | 3753 |
| Elongation @ Break, % | | 409 | 386 | 376 | 429 | 432 | 422 |
| Toughness, psi | | 8945 | 8121 | 7387 | 8376 | 9627 | 9030 |
| Hardness Duro A, pts. | | 39 | 42 | 42 | 40 | 45 | 41 |
| Specific Gravity | | 0.909 | 0.910 | 0.910 | 0.908 | 0.910 | 0.976 |

TABLE V-continued

| Example | 25 | 26 | 27 | 28 | 29 | 30 | 31 |
|---|---|---|---|---|---|---|---|
| Melt Viscosity 70 RPM, 180° C. | | | | | | | |
| Fusion Torque, mg | | 1885 | 1855 | 1855 | 1763 | 1865 | 1886 |
| Fusion Temperature, ° C. | | 155 | 165 | 166 | 167 | 162 | 162 |
| Melt Torque, mg | | 789 | 875 | 829 | 765 | 861 | 851 |
| Energy, kJ | | 51.4 | 49 | 46 | 49.7 | 51 | 48 |
| Fusion Time, Sec | | 100 | 142 | 147 | 114 | 124 | 146 |
| Air Oven Aging, 2 wks. @ 125° C. | | | | | | | |
| Stress @ 100% Elong., MPa | | 13.5 | 11.6 | 12.0 | 12.0 | 11.1 | 11.6 |
| psi | | 1958 | 1682 | 1740 | 1740 | 1610 | 1682 |
| Stress Change, % | | 23 | 4 | 10 | 19 | 1 | 7 |
| Tensile Ultimate @ Break, MPa | | 27.8 | 25.2 | 23.2 | 25.4 | 26.0 | 24.8 |
| psi | | 4027 | 3658 | 3358 | 3688 | 3771 | 3591 |
| Tensile Change, % | | 2 | 3 | 8 | 10 | −6 | −4 |
| Elongation @ Break, % | | 378 | 375 | 352 | 414 | 388 | 378 |
| Elongation Change, % | | −7 | −3 | −6 | −3 | −10 | −10 |
| Toughness, psi | | 9326 | 8182 | 7518 | 9305 | 8503 | 8268 |
| Toughness Change, % | | 4 | 1 | 2 | 11 | −12 | −8 |
| Hardness Duro A, pts | | 51 | 44 | 42 | 47 | 45 | 45 |
| Hardness Change, pts | | 12 | 2 | 0 | 7 | 0 | 4 |
| Weight Change, % | | −9.1 | −1.2 | −1.0 | −5.6 | −0.7 | −1.2 |

TABLE VI

Materials for Tables I–V

| Material | Chemical Description | Supplier |
|---|---|---|
| Royalene ® IM7200 EPDM | a terpolymer of ethylene, propylene and a non-conjugated diene (ENB), medium Mooney, fast curing. | Uniroyal Chemical |
| PDC 1280 | Polypropylene | Basell |
| Kadox 930 | Zinc Oxide | The C.P. Hall Company |
| Stearic acid | | The C.P. Hall Company |
| Trigonox 145-45B-pd | 2,5-bis-(tert-butylperoxy)-2,5-dimethyl-3-hexyne | Akzo Nobel |
| SP-1056 | Halogenated Phenolic resin, substituted at paraposition | Schenectady International |
| SP-1045 | Octylphenol heat reactive resins for rubber cure | Schenectady International |
| RX 13824 | Dimerate Ester | The C.P. Hall Company |
| RX-13804 | Dimerate Ester | The C.P. Hall Company |
| TDT | Tridecyl Tallate | The C.P. Hall Company |
| RX-13892 | Dioleyl Dimerate | The C.P. Hall Company |
| DOS | Dioctyl Sebacate | The C.P. Hall Company |
| Sunpar 2280 | Parrafinic Oil | Sun Oil Company |
| Sunpar 150 | Parrafinic Oil | Sun Oil Company |

What is claimed is:

1. A plasticized thermoplastic polymer/elastomer composite composition comprising a thermoplastic polymer and a rubber selected from the group consisting of natural rubbers, synthetic rubbers, and combinations thereof, and a cyclic dimerate or trimerate ester plasticizer compound having formula I, II, or a mixture thereof:

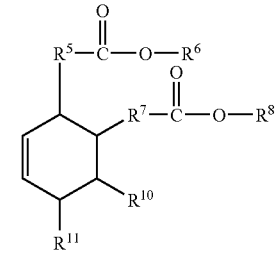

wherein $R^5$ and $R^7$, same or different, are a $C_3$–$C_{24}$ hydrocarbon chain, straight chain or branched, either saturated or having 1 to 6 carbon-to-carbon double bonds;

$R^6$ and $R^8$, same or different, are a $C_3$–$C_{24}$ hydrocarbon chain, straight chain or branched, saturated or unsaturated containing 1 to 3 carbon-to-carbon double bonds; and $R^{10}$ and $R^{11}$, same or different, are a $C_3$–$C_{24}$ saturated hydrocarbon chain, straight chain or branched, or an unsaturated $C_3$–$C_{24}$ hydrocarbon chain, straight chain or branched, having 1 to 6 carbon-to-carbon double bonds;

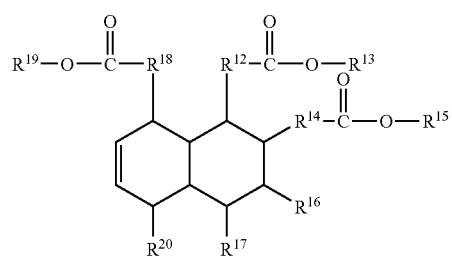

wherein $R^{12}$, $R^{14}$ and $R^{18}$, same or different, are a $C_3$–$C_{24}$ hydrocarbon chain, straight chain or branched, either saturated or having 1 to 6 carbon-to-carbon double bonds;

$R^{13}$, $R^{15}$ and $R^{19}$, same or different, are a $C_3$–$C_{24}$ hydrocarbon chain, straight chain or branched, saturated or unsaturated containing 1 to 3 carbon-to-carbon double bonds; and $R^{16}$, $R^{17}$ and $R^{20}$, same or different, are a $C_3$–$C_{24}$ saturated hydrocarbon chain, straight chain or branched, or an unsaturated $C_3$–$C_{24}$ hydrocarbon chain, straight chain or branched, containing 1 to 6 carbon-to-carbon double bonds.

2. A composition in accordance with claim 1, wherein the plasticizer is selected from the group consisting of formula I, II, and a combination thereof:

wherein $R^5$ and $R^7$ are a $C_6$–$C_{24}$ hydrocarbon chain, straight chain or branched, either saturated or having 1 to 3 carbon-to-carbon double bonds;

$R^6$ and $R^8$, same or different, are a $C_3$–$C_{18}$ hydrocarbon chain, straight chain or branched, saturated or unsaturated containing 1 to 3 carbon-to-carbon double bonds;

$R^{10}$ and $R^{11}$, same or different, are $C_3$–$C_{18}$ saturated hydrocarbon chain, straight chain or branched, or an unsaturated hydrocarbon chain, straight chain or branched, containing 1 to 3 carbon-to-carbon double bonds;

$R^{12}$, $R^{14}$ and $R^{18}$, same or different, are a $C_6$–$C_{24}$ hydrocarbon chain, straight chain or branched, either saturated or containing 1 to 3 carbon-to-carbon double bonds;

$R^{13}$, $R^{15}$ and $R^{19}$, same or different, are a $C_3$–$C_{18}$ hydrocarbon chain, straight chain or branched, saturated or unsaturated containing 1 to 3 carbon-to-carbon double bonds; and $R^{16}$, $R^{17}$ and $R^{20}$, same or different, are a $C_3$–$C_{18}$ saturated hydrocarbon chain, straight chain or branched, or an unsaturated $C_3$–$C_{18}$ hydrocarbon-chain, straight chain or branched, containing 1 to 3 carbon-to-carbon double bonds.

3. A composition in accordance with claim 1, wherein the plasticizer compound having formula I, II, or a mixture thereof is present in an amount of about 0.1 parts to about 45 parts by weight, based on the combined weight of the thermoplastic polymer and rubber compounds.

4. A composition in accordance with claim 1, wherein the plasticizer compound having formula I, II, or a mixture thereof is present in an amount from about 5 parts to about 40 parts by weight, based on the combined weight of the thermoplastic polymer and rubber compounds.

5. A composition in accordance with claim 1, wherein the plasticizer compound having formula I, II, or a mixture thereof is present in an amount from about 10 parts to about 35 parts by weight, based on the combined weight of the thermoplastic polymer and rubber compounds.

6. A composition in accordance with claim 1, wherein the plasticizer is an unsaturated diester formed by the reaction of a $C_{36}$ dimer acid and a $C_3$–$C_{18}$ alcohol, straight chain or branched, saturated, or unsaturated containing 1 to 3 carbon-to-carbon double bonds.

7. A composition in accordance with claim 6, wherein the alcohol is 2-ethylhexyl alcohol.

8. A composition in accordance with claim 6, wherein the alcohol is tridecyl alcohol.

9. A composition in accordance with claim 6, wherein the alcohol is oleyl alcohol.

10. A composition in accordance with claim 1, wherein the plasticizer comprises the following dimerate acid reacted with a $C_3$–$C_{24}$ alcohol:

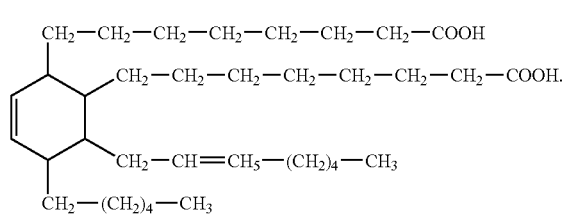

11. A composition in accordance with claim 1, wherein the plasticizer comprises the following dimerate acid reacted with a $C_3$–$C_{24}$ alcohol:

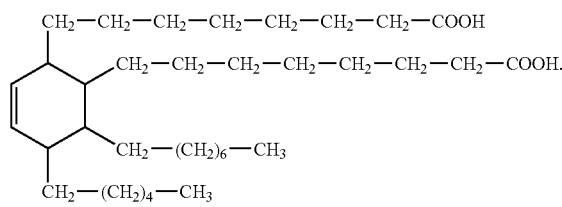

12. A composition in accordance with claim 1, wherein the plasticizer comprises the following dimerate acid reacted with a $C_3$–$C_{24}$ alcohol:

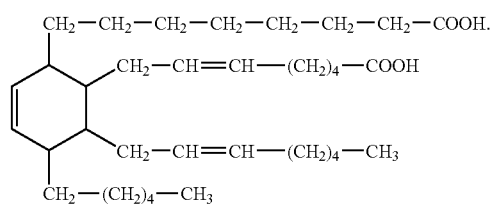

13. A composition in accordance with claim 1, wherein the plasticizer is the reaction product of a $C_3$–$C_{24}$ alcohol with a tricarboxylic acid, having the following formula:

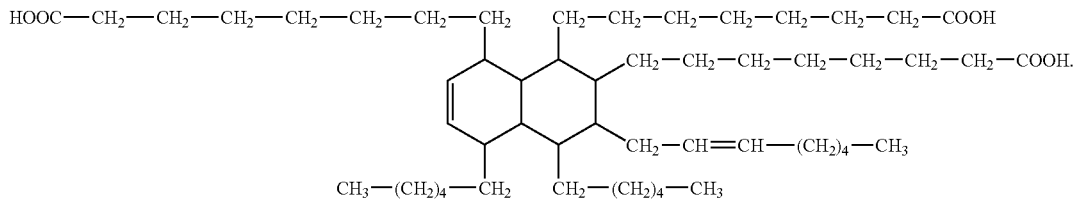

14. A composition in accordance with claim 1 wherein the plasticizer is a combination of compounds in accordance with formulas I and II.

15. A composition in accordance with claim 14, wherein the plasticizer is a reaction product of a $C_3$–$C_{24}$ alcohol straight chain or branched, saturated, or unsaturated having 1 to 3 carbon-to-carbon double bonds, with a dimer acid having CAS #61788-89-4.

16. A composition in accordance with claim 15, wherein the alcohol is 2-ethylhexyl alcohol.

17. A composition in accordance with claim 15, wherein the alcohol is a tridecyl alcohol.

18. A composition in accordance with claim 15, wherein the alcohol is a oleyl alcohol.

19. A composition in accordance with claim 1, wherein $R^5, R^7, R^{12}, R^{14}$ and $R^{18}$ are fatty acid residues derived from animal or vegetable fatty acids.

20. A composition in accordance with claim 19, wherein the fatty acid residues are derived from the group consisting of butter; lard; tallow; grease; herring; menhaden; pilchard; sardine; babassu; castor; coconut; corn; cottonseed; jojoba; linseed; oiticia; olive; palm; palm kernel; peanut; rapeseed; safflower; soya; sunflower; tall; tung; and mixtures thereof.

21. A composition in accordance with claim 19, wherein the fatty acid residues are selected from the group consisting of hexanoic; octanoic; decanoic; dodecanoic; 9-dodecenoic; tetradecanoic; 9-tetradecenoic; hexadecanoic; 9-hexadecenoic; octadecanoic; 9-octadecenoic; 9,12-octadecadienoic; 9,12,15-octadecatrienoic; 9,11,13-octadecatrienoic; octadecatetrenoic; eicosanoic; 11-ejeosenoic; eicosadienoic; eicosatrienoic; 5,8,11,14-eicosatetraenoic; eicosapentaenoic; docosanoic; 13-docosenoic; docosatetraenoic; 4,8,12,15,19-docosapentaenoic; docosahexaenoic; tetracosenoic; and 4,8,12,15,18,21-tetracosahexaenoic.

22. A composition in accordance with claim 1, further comprising a vulcanization agent.

23. A method of plasticizing a composite composition including a thermoplastic polymer, a rubber selected from the group consisting of natural rubbers, synthetic rubbers and a combination thereof, and a rubber vulcanizing agent, comprising adding to said composite composition a cyclic ester plasticizer of formula I, II, or mixtures thereof:

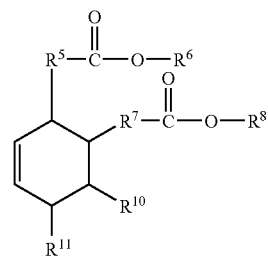

wherein $R^5$ and $R^7$, same or different, are a $C_3$–$C_{24}$ hydrocarbon chain, straight chain or branched, either saturated or having 1 to 6 carbon-to-carbon double bonds;

$R^6$ and $R^8$, same or different, are a $C_3$–$C_{24}$ alkyl radical, straight chain or branched; and $R^{10}$ and $R^{11}$, same or different, are a $C_3$–$C_{24}$, saturated hydrocarbon chain, straight chain or branched, or an unsaturated $C_3$–$C_{24}$, hydrocarbon chain, straight chain or branched, having 1 to 6 carbon-to-carbon double bonds;

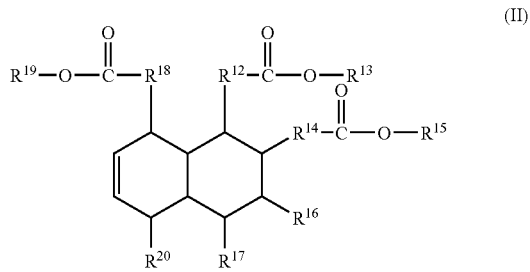

wherein $R^{12}$, $R^{14}$ and $R^{18}$, same or different, are a $C_3$–$C_{24}$ hydrocarbon chain, straight chain or branched, either saturated or having 1 to 6 carbon-to-carbon double bonds;

$R^{13}$, $R^{15}$ $R^{19}$, same or different, are a $C_3$–$C_{24}$ hydrocarbon chain, straight chain or branched, saturated or unsaturated containing 1 to 3 carbon-to-carbon double bonds; and $R^{16}$, $R^{17}$ and $R^{20}$, same or different, are a $C_3$–$C_{24}$ saturated hydrocarbon chain, straight chain or branched, or unsaturated $C_3$–$C_{24}$ hydrocarbon chain, straight chain or branched, containing 1 to 6 carbon-to-carbon double bonds.

24. The method of claim 23, wherein the cyclic ester plasticizer is added in an amount from about 0.1 parts to about 45 parts by weight, based on the combined weight of the thermoplastic polymer and rubber compounds.

25. The method of claim 23, wherein the cyclic ester plasticizer is added in an amount from about 5 parts to about 40 parts by weight, based on the combined weight of the thermoplastic polymer and rubber compounds.

26. The method of claim 23, wherein the cyclic ester plasticizer is added in an amount from about 10 parts to about 35 parts by weight, based on the combined weight of the thermoplastic polymer and rubber compounds.

* * * * *

UNITED STATES PATENT AND TRADEMARK OFFICE
CERTIFICATE OF CORRECTION

PATENT NO. : 7,232,855 B2
APPLICATION NO. : 10/360294
DATED : June 19, 2007
INVENTOR(S) : Stephen O'Rourke et al.

Page 1 of 1

It is certified that error appears in the above-identified patent and that said Letters Patent is hereby corrected as shown below:

In the Claims:

At Column 21, lines 51-52, "9, 12-octadecaclienoic" should be
-- 9,12-octadecadienoic --.

At Column 22, line 64, "$R^{15}R^{19}$" should be -- $R^{15}$ and $R^{19}$ --.

Signed and Sealed this

Eleventh Day of December, 2007

JON W. DUDAS
*Director of the United States Patent and Trademark Office*